Figure 1:
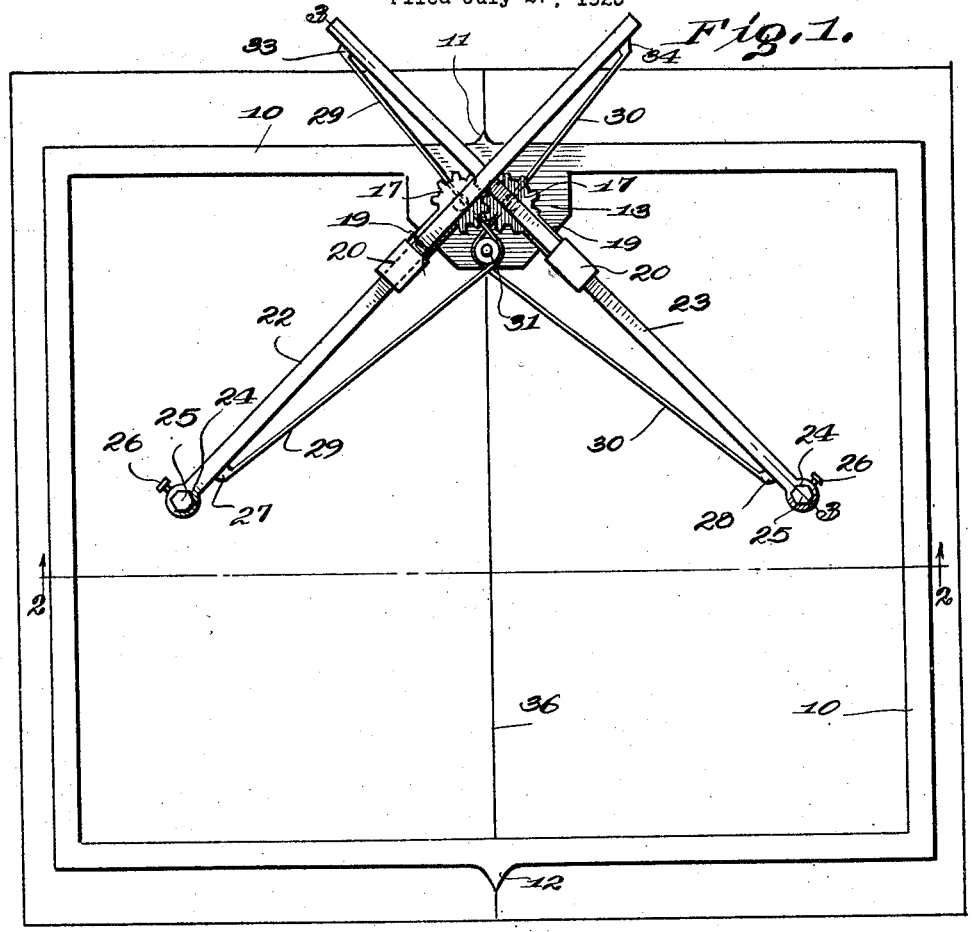

Dec. 21, 1926.

J. SOLARY

DRAWING INSTRUMENT

Filed July 27, 1925

1,611,690

Inventor

John Solary

Patented Dec. 21, 1926.

1,611,690

UNITED STATES PATENT OFFICE.

JOHN SOLARY, OF SEATTLE, WASHINGTON.

DRAWING INSTRUMENT.

Application filed July 27, 1925. Serial No. 46,283.

The present invention relates to a drawing instrument and more particularly to a device whereby a complete symmetrical drawing is made while actually only tracing one-half of the drawing, an object of the invention being to provide a novel and improved device of this character which will be convenient to operate in order to produce an efficient result.

Another object of the invention is the provision of a pair of arms which are adapted to cross each other, both of which are adapted to swing radially upon movement of one arm, and both being so connected as to slide simultaneously so as to produce a symmetrical drawing.

A further object of the invention is to provide a device as indicated which can also be used as a pantograph for copying drawings, maps, pictures, and the like, identical in size and shape as the original ones.

It is also an object of the invention to provide an instrument as outlined above, which is simple and substantial in construction, which can be manufactured economically, and which will be efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

Figure 2:
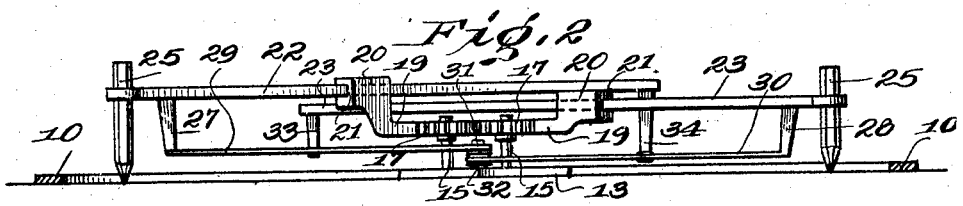
Figure 3:
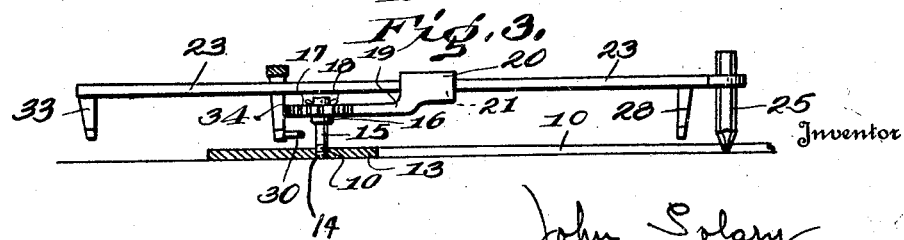

The invention is illustrated in the accompanying drawings, wherein:

Figure 1 is a plan view of my improved device, showing the same applied to a sheet of drawing paper for use, Figure 2 is a section taken on line 2—2 of Figure 1, and Figure 3 is a section on line 3—3 of Figure 1.

In carrying out the invention the numeral 10 designates a rectangular frame, which has provided on its upper and lower parallel sides a pair of pointed projections 11 and 12, which are arranged intermediate the ends of said upper and lower sides, the purpose of said pointed projections being set forth as the description proceeds. On the upper side of the frame 10 and arranged to extend inwardly thereof is an extension plate 13, which is provided with threaded openings 14 into which are threadedly received upright bearing supports 15. The bearing supports 15 are provided with collars 16 adjacent their upper ends which have resting thereon segments 17. The segments 17 are pivotally supported on the bearing shafts 15 and arranged to mesh with each other, said segments being held on said bearing shafts by means of small pins 18 extending through said shafts. The segments 17 are provided with small arms 19 which extend outwardly therefrom and have provided on their outer ends blocks 20 provided with rectangular openings 21 through which are slidably mounted a pair of rods 22 and 23.

The rods 22 and 23 cross each other slightly in rear of the segments 17, one of them being positioned slightly above the other, due to the fact that one of the bearing blocks 20 is arranged in such raised position. The forward ends of the rods 22 and 23 are provided with hexagonal openings 24 extending vertically therethrough for receiving short stub pencils 25, said pencils being retained against movement with relation to said rods by set screws 26 threaded through said rods and in engagement with said pencils. The lower ends of the pencils are sharpened so as to contact with the paper placed under the rectangular frame.

At the forward ends of the rods 22 and 23 are downwardly extending projections 27 and 28 to which are secured by welding or the like the forward ends of a pair of metallic cords 29 and 30 respectively. As the metallic cords 29 and 30 extend rearwardly they are trained about a pair of pulleys or rollers 31 and 32 rotatably mounted upon the forward end of the plate 13 and have their rear ends welded or otherwise secured to a pair of downwardly extending projections 33 and 34 carried by the rear ends of the rods 22 and 23. It will be noted that the metallic cord 29 which is attached at its forward end to the forward end of the rod 22 has its rearward end attached to the rear end of the rod 23 and that the forward end of the metallic cord 30 has its forward end attached to the rod 23 while its rear end is attached to the rear end of the rod 22. By this arrangement it will be noted that when either one of the rods 22 or 23 are slid forwardly through the bearing blocks 20 the other of said rods will be moved simultaneously. In order that the metallic cords will not interfere with each other, the cord 29 is positioned slightly above the cord 30 and is adapted to be trained about the uppermost of the pulleys or rollers 31 and 32, said cord 29 being attached at its opposite ends to the downwardly projecting members 27 and 33 which do not extend in a downward direction as far as the projections 28 and 34 which are attached to the cord 30.

In operation, the rectangular frame is placed upon a sheet of paper which is provided with a center line 36, the pointed projections 11 and 12 acting as means to indicate that the frame is positioned properly upon the paper. By moving one of the rods radially the other of said rods will be moved so as to scribe a like arc, due to the fact that one segment will cause the turning of the other. When one of the arms is slid through its bearing block 20, the other of said arms will also be slid, due to the fact that the metallic cords are so arranged that a forward movement of one arm will pull on one of the cables thus causing a like forward movement of the other arm. It can thus be seen that drawings made on one-half of the paper will produce like drawings on the other half thereof, thus producing a symmetrical drawing. When the device is to be used as a pantograph a picture or drawing is placed beneath the pencil on one arm and said pencil is moved according to the lines on said drawing which will cause the other of said pencils to be moved in like directions, which will produce an upright reversed copy of the original picture or drawing.

From the foregoing, it can be seen that I have provided a device of the kind indicated, which is extremely simple in construction and which will be thoroughly efficient in producing an identical or symmetrical drawing.

Having thus described my invention, what I claim as new is:

1. A drawing instrument of the character described comprising a pair of crossed rods, means for slidably supporting said rods, pencils supported by the forward ends of said rods, means connecting said rods for causing one rod to be swung radially upon swinging of the other one of said rods, and means connecting said rods so as to cause the same to be slid forwardly or rearwardly simultaneously.

2. A drawing instrument of the character described comprising a pair of rods, a pair of segments engaging each other, an arm carried by each segment slidably receiving said rods respectively, means connecting said segments serving as means for causing both of said rods to be swung radially upon swinging of one of said rods, and means for connecting said rods together to cause the same to be slid forwardly or rearwardly simultaneously.

3. A drawing instrument of the character described comprising a pair of rods, means for slidably supporting said rods, pencils supported by the forward ends of said rods, means connecting said rods for causing both of said rods to be swung radially upon swinging movement of one of said rods, cords having the forward ends thereof attached to the forward ends of said rods respectively, while the rear end of each respective cord is attached to the rear end of the other rod so as to cause both of said rods to be slid forwardly or rearwardly simultaneously, and roller means around which each of said cords passes.

4. A drawing instrument of the character described comprising a pair of rods, a pair of segments engaging each other, arms carried by said segments for slidably supporting said rods respectively, pencils supported by the forward ends of said rods, said segments serving as means for causing both of said rods to be swung radially simultaneously, a pair of cords each having its forward end attached to one of said rods respectively while its rear end is attached to the opposite rod from which its forward end is attached so as to cause both of said rods to be slid forwardly or rearwardly simultaneously, and roller means adjacent said segments around which each of said cords passes.

5. A drawing instrument of the character described comprising a rectangular frame, a plate carried by said frame, a pair of segments pivotally supported upon said plate and engaging each other, arms carried by said segments respectively, bearing blocks carried by said arms respectively, a pair of rods one slidably supported in each of said bearing blocks, pencils carried by the forward ends of said rods, and means connecting said rods to cause the same to be slid forwardly or rearwardly simultaneously.

6. A drawing instrument of the character described comprising a rectangular frame, a plate carried by said frame, a pair of segments pivotally supported upon said plate and engaging each other, an arm carried by said segments, bearing blocks carried by each of said arms, a pair of rods slidably supported in said bearing blocks respectively, pencils carried by the forward ends of said rods, a pair of cords each having its forward end attached to the forward ends of said rods respectively while its rear end is attached to the rear end of the rods opposite to that which its forward end is attached to so as to cause both of said rods to be slid forwardly through their respective bearing blocks or rearwardly through their respective bearing blocks simultaneously, and roller means adjacent said segments around which each of said cords passes.

7. A drawing instrument of the character described comprising a rectangular frame, a plate carried by said frame, a pair of segments pivotally supported by said plate and engaging each other, arms carried by said segments respectively, bearing blocks carried by each of said arms, a pair of rods one slidably supported in each of said bearing blocks, pencils adjustably carried by the forward ends of said rods, downwardly extending projections carried by the forward and rear ends of said rods, a pair of rollers pivotally mounted upon said plate slightly in advance of said segments, and cords passed around said rollers and each attached to a projection carried by the forward end of one of said rods while its rear end is attached to the projection carried by the rear end of the opposite rod so as to cause said arms to be slid forwardly or rearwardly in their respective bearing blocks simultaneously.

8. A drawing instrument of the character described comprising a rectangular frame, a plate carried by said frame, a pair of segments pivotally supported by said plate and engaging each other, arms carried by said segments respectively, bearing blocks carried by each of said arms, a pair of rods one slidably supported in each of said bearing blocks, pencils adjustably carried by the forward ends of said rods, downwardly extending projections carried by the forward and rear ends of said rods, a pair of rollers pivotally mounted upon said plate slightly in advance of said segments, cords passed around said rollers and each having its forward end attached to a projection carried by the forward end of one of said rods while its rear end is attached to the projection carried by the rear end of the opposite rod, so as to cause said arms to be slid forwardly or rearwardly in their respective bearing blocks simultaneously, and means provided upon said rectangular frame for indicating the proper positioning of the instrument.

In testimony whereof, I have affixed my signature.

JOHN SOLARY.